United States Patent
Karampuri et al.

(10) Patent No.: US 11,157,456 B2
(45) Date of Patent: *Oct. 26, 2021

(54) REPLICATION OF DATA IN A DISTRIBUTED FILE SYSTEM USING AN ARBITER

(71) Applicant: Red Hat, Inc., Raleigh, NC (US)

(72) Inventors: Pranith Kumar Karampuri, Karnataka (IN); Ravishankar Narayanankutty, Karnataka (IN)

(73) Assignee: Red Hat, Inc., Raleigh, NC (US)

( * ) Notice: Subject to any disclaimer, the term of this patent is extended or adjusted under 35 U.S.C. 154(b) by 188 days.

This patent is subject to a terminal disclaimer.

(21) Appl. No.: 16/389,364

(22) Filed: Apr. 19, 2019

(65) Prior Publication Data

US 2019/0243807 A1 Aug. 8, 2019

Related U.S. Application Data (63) Continuation of application No. 15/042,021, filed on Feb. 11, 2016, now Pat. No. 10,275,468.

(51) Int. Cl.
*G06F 16/178* (2019.01)
*G06F 16/182* (2019.01)

(52) U.S. Cl.
CPC ........ *G06F 16/178* (2019.01); *G06F 16/1844* (2019.01)

(58) Field of Classification Search
CPC ................................. G06F 16/17; G06F 16/18
USPC .... 707/620, 999.01; 709/201, 203, 208, 226
See application file for complete search history.

(56) References Cited

U.S. PATENT DOCUMENTS

| | | | |
|---|---|---|---|
| 5,850,522 A | 12/1998 | Wlaschin | |
| 6,182,121 B1 | 1/2001 | Wlaschin | |
| 6,718,361 B1 * | 4/2004 | Basani | H04L 67/1095 707/999.01 |
| 6,748,447 B1 * | 6/2004 | Basani | H04L 67/1095 709/219 |
| 7,346,682 B2 * | 3/2008 | Basani | H04L 67/1095 709/219 |
| 7,373,545 B2 | 5/2008 | Leveille et al. | |
| 7,610,342 B1 | 10/2009 | Pettigrew et al. | |
| 7,747,741 B2 * | 6/2010 | Basani | H04L 67/1095 709/224 |
| 8,086,661 B2 | 12/2011 | Holenstein et al. | |
| 8,260,830 B2 | 9/2012 | Middlecamp et al. | |

(Continued)

FOREIGN PATENT DOCUMENTS

CN 103684941 A 3/2014

OTHER PUBLICATIONS

Ravishankar N; Arbiter for 3 way Replication; http://review.gluster.org/#/c/9656/3; Feb. 16, 2015; 3 pgs.

(Continued)

*Primary Examiner* — Baoquoc N To
(74) *Attorney, Agent, or Firm* — Lowenstein Sandler LLP (57) ABSTRACT

A request to perform a write operation on a file stored in a distributed file system may be received. A determination may be made as to whether a quorum of servers of the distributed file system is satisfied. The servers of the quorum may be used to perform the write operation or to record the write operation. The write operation may be performed on the file in view of determining that the quorum has been satisfied.

14 Claims, 7 Drawing Sheets

(56) References Cited

U.S. PATENT DOCUMENTS

| | | | |
|---|---|---|---|
| 9,146,794 B2 | 9/2015 | Xun et al. | |
| 2002/0116611 A1* | 8/2002 | Zhou | H04L 9/004 |
| | | | 713/156 |
| 2003/0149709 A1 | 8/2003 | Banks | |
| 2003/0195955 A1 | 10/2003 | Cochran et al. | |
| 2004/0215709 A1* | 10/2004 | Basani | H04L 69/329 |
| | | | 709/201 |
| 2005/0198389 A1* | 9/2005 | LaSalle | H04L 67/2823 |
| | | | 709/246 |
| 2006/0206534 A1 | 9/2006 | Banks et al. | |
| 2007/0214183 A1* | 9/2007 | Howe | G06F 16/10 |
| 2008/0177861 A1* | 7/2008 | Basani | H04L 69/329 |
| | | | 709/218 |
| 2008/0270596 A1* | 10/2008 | Wahl | H04L 67/1095 |
| | | | 709/224 |
| 2010/0161780 A1* | 6/2010 | Lee | H04L 67/22 |
| | | | 709/223 |
| 2012/0166390 A1 | 6/2012 | Merriman et al. | |
| 2014/0173330 A1 | 6/2014 | Samanta et al. | |
| 2016/0026436 A1 | 1/2016 | Shen | |

OTHER PUBLICATIONS

Ravishankar N; Bug 1217689—[RFE] Arbiter for 3 way Replication; https://bugzilla.redhat.com/show_bug.cgi?id=1217689; 2015; 6 pgs.

Ravishankar N; Bug 1199985—[RFE] Arbiter for 3 way Replication; https://bugzilla.redhat.com/show_bug.cgi?id=1199985; 2015; 5 pgs.

Dumitrescu, Bogdan; How to avoid the split-brain problem in elasticsearch; http://blog.trifork.com/2013/10/24/how-to-avoid-the-split-brain-problem-in-elasticsearch/; Oct. 24, 2013; 8 pages.

\* cited by examiner

REPLICATION OF DATA IN A DISTRIBUTED FILE SYSTEM USING AN ARBITER

RELATED APPLICATION

This application is a continuation of and claims priority to U.S. patent application Ser. No. 15/042,021 filed on Feb. 11, 2016, which is incorporated by reference herein.

TECHNICAL FIELD

Aspects of the disclosure relate generally to a distributed file system and, more specifically, relate to the replication of data in a distributed file system using an arbiter.

BACKGROUND

A distributed file system may be a file system that stores data across multiple servers. For example, files may be stored in the distributed file system across multiple storage resources that are managed by multiple servers. Users may access the distributed file system by logging in to a client system and requesting access to read files that are stored in the distributed file system or to write files to be stored in the distributed file system.

The data stored in the distributed file system may be replicated to improve reliability and accessibility of the data to users of the distributed file system. For example, a file may be stored at both a first storage resource and a second storage resource of the distributed file system. As the file is modified at the first storage resource, the modifications to the file may be copied or replicated at the copy of the file stored at the second storage resource so that the same file is stored at both the first and second storage resources.

The replication of the file may allow a copy of the file to be accessed by a user of the distributed file system if either the first storage resource or the second storage resource are unavailable. For example, if a storage server that manages the first storage resource is offline, then the copy of the file stored at the second storage server may be provided to a user of the distributed file system when requesting access to the file.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Embodiments of the disclosure relate to a replication of data in a distributed file system using an arbiter. A distributed file system may be a type of cloud computing infrastructure or system that includes multiple servers. The servers of the distributed file system may be associated with or manage storage resources to store files or other such data.

The files of the distributed file system may be replicated so that more than one copy of the file is stored at more than one of the storage resources. For example, a first copy of the file may be stored at a first storage resource managed by a first storage server and a second copy of the same file may be stored at a second storage resource that is managed by a second storage server. The first copy of the file that is stored at the first storage resource may be modified by users of the distributed file system and the second copy of the file that is stored at the second storage resource may be modified to reflect the modifications to the first storage resource. For example, the first copy of the file and the second copy of the file may be simultaneously modified (e.g., a write operation to the file is transmitted to the servers associated with each of the first and second storage resources). As such, a file in a distributed file system may be replicated at a first and second storage resources that are respectively managed by first and second storage servers.

If one of the first or second storage servers are unavailable when a user of the distributed file system modifies the file, then the first copy of the file and the second copy of the file may no longer be consistent (e.g., the first and second copies of the file are no longer identical). Such an inconsistency of the file may be addressed by a consistency associated with triple replication of the file. For example, the distributed file system may perform triple replication of the file by storing copies of the file at three different storage resources that are managed by different storage servers. Thus, if one of the three storage servers are unavailable, then at least two of the other storage servers may store consistent copies of the file at their respective storage resources. The storage server that was previously unavailable may be healed (i.e., the file is made consistent) based on the write operations that modified both of the copies of the file at the other two storage servers. However, storing copies of the file at three different storage servers may use a substantial amount of storage capacity of the distributed file system.

Aspects of the present disclosure provide a distributed file system that may use an arbiter system with two storage servers to provide a consistency of data associated with triple replication of data for a file while storing two copies of the file within the distributed file system. For example, a first copy and a second copy of the file may be stored at first and second storage servers of the distributed file system. Instead of storing a third copy of the file, an arbiter system may be used to store metadata associated with the file without storing a copy of the file itself. The data associated with the file that is stored at the arbiter system (e.g., metadata of the file) may identify write operations to the file that have been received by the distributed file system. Such information may identify whether a write operation to a file of the distributed file system was successfully recorded by the arbiter system. The data associated with the file that is stored at the arbiter system may be referred to as metadata.

The distributed file system may allow a write operation to be performed to the file when a quorum between the first and second storage servers and the arbiter system has been reached. For example, when at least two of the first storage server, second storage server, and arbiter system are available and online, then a quorum may be considered to be reached. In some embodiments, if the quorum is met based on the first and second storage servers being available while the arbiter system is unavailable, then the write operations may be performed on the file and the arbiter system may be healed (e.g., write operation data that occurred when the arbiter system was unavailable may be updated at the arbiter system when it returns to be available). In some embodiments, the healing of the arbiter system may be based on the updating of the data, or metadata, that is associated with the file as opposed to write operations to another copy of the file. In the same or alternative embodiments, if the quorum is met based on one of the first or second storage servers being available as well as the arbiter system being available, then the write operation may be performed on the file based on write operation data of the arbiter system identifying the one storage server that is available. If the write operation data at the arbiter system indicates that the one storage server is consistent with the arbiter system (e.g., the storage server is not pending a healing operation), then the write operation may be performed to modify the file. Otherwise, if the write operation data at the arbiter system indicates that the storage server that is available is not consistent, then the write operation may not be allowed to modify the file.

The determination of the write operation data at the arbiter system as to whether the available storage server is consistent with the arbiter system may ensure that the arbiter system, which does not store a copy of the file, is not the only server that has identified all write operations to the file. For example, if a user of the distributed file system initiates a write operation to the file while the arbiter system and the first storage server are online and the second storage server is offline, and then subsequently the user initiates another write operation to the file while the arbiter system and the second storage server are available and the first storage server is unavailable, then neither the first storage server nor the second storage server may store the true copy of the file (i.e., as modified by all write operations) as the second storage server that is subsequently made available may still be subjected to a healing operation to modify the copy of the file stored at the second storage server. As such, only the arbiter system may identify or receive all of the write operations to the file, but since the arbiter system does not store a copy of the file, then no true copy of the file may be stored in the distributed file system. Thus, the use of the write operation data may be used to prevent such a scenario.

As such, aspects of the present disclosure may address the above and other deficiencies by using an arbiter system to store data associated with write operations to a file in a distributed file system as well as two storage servers with storage resources to store separate copies of the file.

Figure 1:
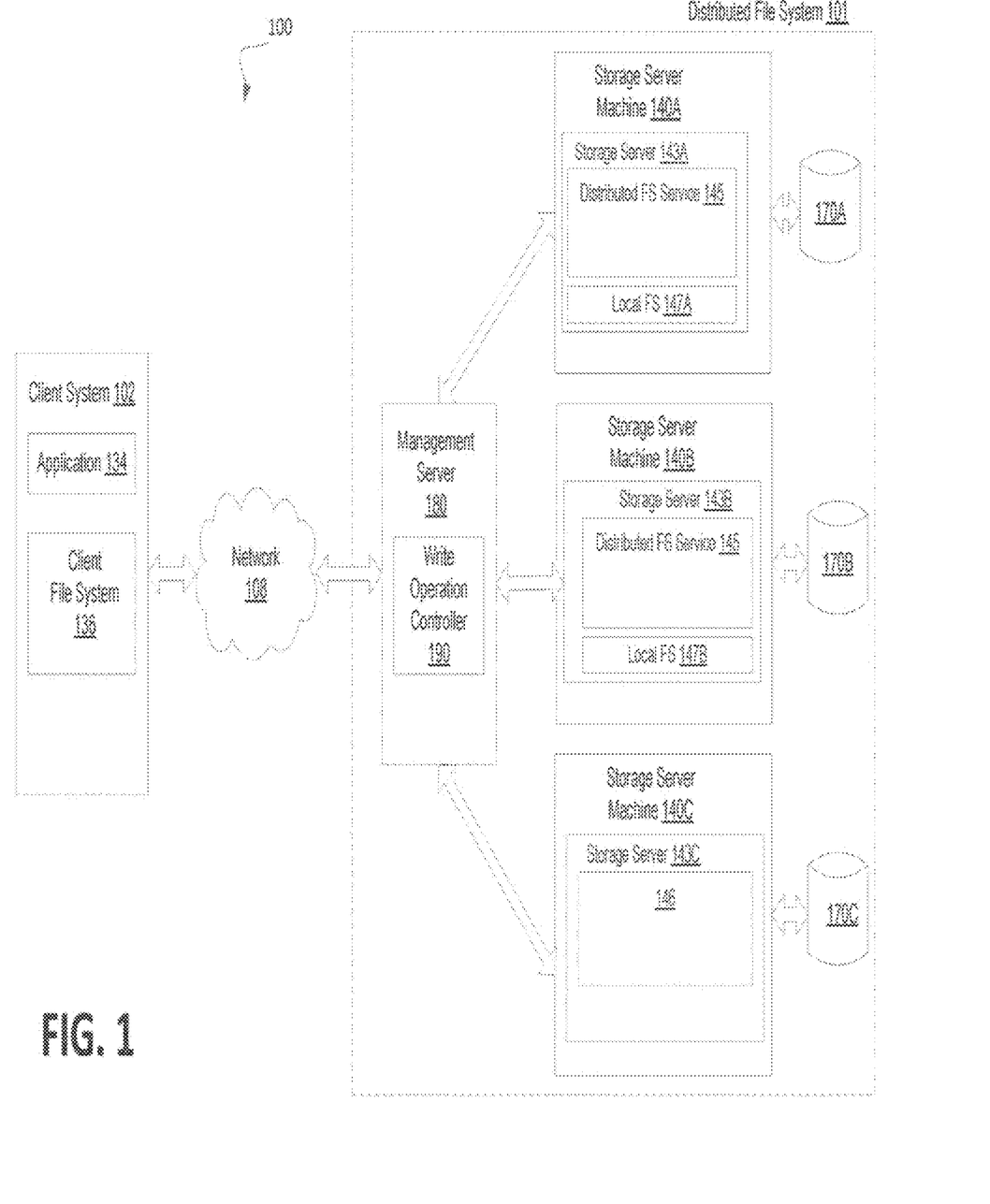
FIG. 1 illustrates an example system architecture in which embodiments of the disclosure may operate.

FIG. 1 is an example system architecture 100 for various implementations of the disclosure. The system architecture 100 may include a distributed file system 101 coupled to one or more client machines 102 via a network 108. The network 108 may be a public network (e.g., the Internet), a private network (e.g., a local area network (LAN) or wide area network (WAN)), or a combination thereof. Network 108 may include a wireless infrastructure, which may be provided by one or multiple wireless communications systems, such as a wireless fidelity (WiFi) hotspot connected with the network 108 and/or a wireless carrier system that can be implemented using various data processing equipment, communication towers, etc.

The distributed file system 101 may be a network attached storage file system that includes one or more storage server machines 140A and 140B, each of which may control and manage any number of storage resources 170A and 170B. Furthermore, a storage server machine 140C may correspond to an arbiter system that may control and manage a storage resource 170C that stores data associated with write operations at a storage resource 170C. A storage server machine 140A-C may include a network-accessible server-based functionality (e.g., storage server 143A-C) or other data processing equipment. The storage server machines 140A-C may include, but are not limited to, any data processing device, such as a desktop computer, a laptop computer, a mainframe computer, a personal digital assistant, a rack-mount server, a hand-held device or any other device to process data. The storage server machines 140A-B and arbiter system of the distributed file system 101 may be grouped into one or more clusters. A cluster may be a group of linked storage servers 143A-C working together closely.

The storage resources 170A-C may be mass storage devices, such as magnetic or optical storage based disks, solid-state drives (SSDs) or hard drives, coupled to the storage server machines 140A-C (either directly or via the network 108). The storage resources 170A-C may also include memory such as random access memory (RAM), Flash memory, and so forth. For convenience, some embodiments provided herein may be described with reference to disks or other mass storage devices. However, it should be understood that such embodiments may also apply to memory storage resources.

Storage servers 143A-C may each host a local file system that manages the storage of data on storage resources 170A-C. Each of the storage resources 170A-C may be formatted in accordance with a particular local file system (FS) 147A-C. The local FS 147A-C may create directories, partitions, logical volumes, and so forth on the storage resources 170A-C as well as store data (e.g., files) thereon. Examples of local disk file systems that may be used on disk storage resources include, but are not limited to, EXT3, EXT4, XFS, and NTFS, and so forth. Various flash file systems, tape file systems, optical disc file systems, memory files systems and so on may alternatively be used for other non-disk storage resources (e.g., for memory storage resources).

Storage servers 143A-C may each additionally include an instance of a distributed file system (FS) service 145. The distributed FS service 145 interfaces with local file systems 147A-B to store files on the storage resources 170A-B, as well as allow retrieval of stored files to the client system 102. The distributed file system service 145 instances additionally interface with one another to form the distributed file system 101. Furthermore, the storage server 143C may correspond to an arbiter system that includes a write operation service 146 that identifies write operations to a file stored at the storage resources 170A-B.

The distributed file system services 145, and thus the distributed file system 101, may store data as files and may include directories, also referred to as folders, which are virtual containers within the distributed file system 101, in which groups of computer files and possibly other directories may be kept and organized. The distributed file system 101 may organize data (e.g., files) in the disks 170A-B using volumes. A volume may be a single accessible storage area of the distributed file system 101 that may be resident on a single partition or directory of a hardware resource 170A-B (e.g., of a hard disk) of the file system 101. A volume may be a representation of a logical location, rather than a physical location, of a storage area in the file system 101. For example, a physical hard disk-1 may have two partitions, partition-1 and partition-2. A volume label "C:" may be assigned to partition-1 and a volume label "D:" may be assigned to partition-2. Hard disk-1 is a physical disk and "C:" and "D:" are volumes representing logical locations on physical hard disk-1. Additionally, the volume may be a collection of multiple logical and/or physical locations.

In some embodiments, a volume of the distributed file system 101 may be associated with multiple storage resources 170A-C. Files of a volume may be stored across the storage resources 170A-B and data associated with write operations may be stored at the storage resource 170C. For example, a volume label "C:" may be assigned to a partition or portion of a first storage resource 170A and a partition or portion of a second storage resource 170B. As such, files of a single volume may be distributed between multiple storage resources 170A-B.

Any number of client systems 102 may include a client file system 136 to communicate with the storage servers 143A-C in the distributed file system 101. The client system 102 may a computing device such as a server computer, a desktop computer, a set-top box, a gaming console, a television, a portable computing device such as, and not limited to, mobile telephones, personal digital assistants (PDAs), portable media players, netbooks, laptop computers, electronic book reader, and the like. The client machines 102 may host one or more applications 134. An application 134 may be any type of application including, but not limited to, a web application, a desktop application, a browser application, etc. An application 134 may request access (e.g., read, write, etc.) to the data in the distributed file system 101. For example, the application 134 may request to read or write files stored in a volume associated with storage resources 170A-C.

The distributed file system 101 may include a management server 180. In some embodiments, the management server 180 may receive read and write requests from the client systems 102 and may manage the storing and retrieval of files at the storage resources 170A-B and the receiving of write operation data at the storage resource 170C. For example, a write operation controller 190 may determine whether to allow a write operation from a client system 102 to be performed on a file with copies stored at the storage resources 170A-B based on the availability of the storage resources 170A-B and the storage resource 170C that may correspond to an arbiter system. Further details with regard to the write operation controller are described below.

Figure 2:
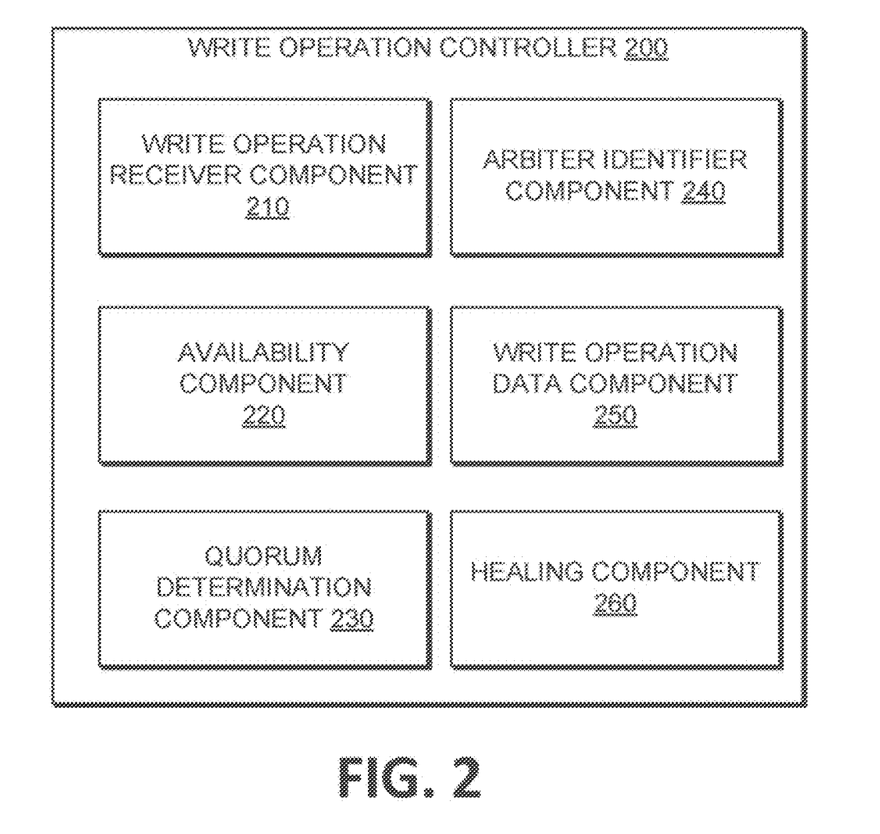
FIG. 2 illustrates an example write operation controller in accordance with some embodiments of the disclosure.

FIG. 2 is a block diagram of an example write operation controller 200. In general, the write operation controller 200 may correspond to the write operation controller 190 of FIG. 1. The write operation controller 200 may include a write operation receiver component 210, an availability component 220, a quorum determination component 230, an arbiter identifier component 240, a write operation data component 250, and a healing component 260. In alternative embodiments, the functionality of one or more of the components may be combined or divided.

As shown in FIG. 2, the write operation controller 200 may include a write operation receiver component 210 that may receive a request to modify or change a file that is stored in a distributed file system. For example, a client system may issue a write request of a file that is stored in a volume of a distributed file system.

The write operation controller 200 may include an availability component 220 that may determine an availability of storage server systems and an arbiter system. For example, the availability or a determination may be made as to whether a storage server system is online to modify a stored copy of a file in response to a received write operation and whether an arbiter system is online to store that the write operation to the file has been received by the distributed file system. For example, a determination may be made as to whether each of a first storage server, a second storage server, and an arbiter system are available (i.e., online) or unavailable (i.e., offline). The storage servers may be considered to be available when a file stored at the respective storage server may be modified when the write operation is received and the arbiter system may be considered to be available when the write operation may be recorded when it is received by the distributed file system.

As shown in FIG. 2, the write operation controller 200 may further include a quorum determination component 230 that may determine whether a quorum is present for a file subjected to a write operation. For example, the quorum determination component 230 may determine whether at least two of a first storage server, a second storage server, and an arbiter system that are associated with the file that is subjected to a write operation are available or online. Furthermore, the arbiter identifier component 240 may determine whether the quorum is met with the arbiter system being available. For example, the determination of a quorum being met may correspond to one of the storage servers that stores a copy of the file and the arbiter system being available.

The write operation controller 200 may further include a write operation data component 250 that may determine whether write operation data associated with the arbiter system indicates that the available storage server is consistent with the arbiter system. Further details with regard to the storage server being consistent with the arbiter system of write operation data are described in conjunction with FIGS. 3 and 5. The healing component 260 may perform healing operations on the storage servers and the arbiter system. In some embodiments, the healing operations may correspond to making copies of a file consistent and/or making copies of the file consistent with associated with write operation data of an arbiter system. For example, the healing operations may be performed on a storage server or the arbiter system if either server or system is unavailable when a write operation has been performed on the file in the distributed file system.

Figure 3:
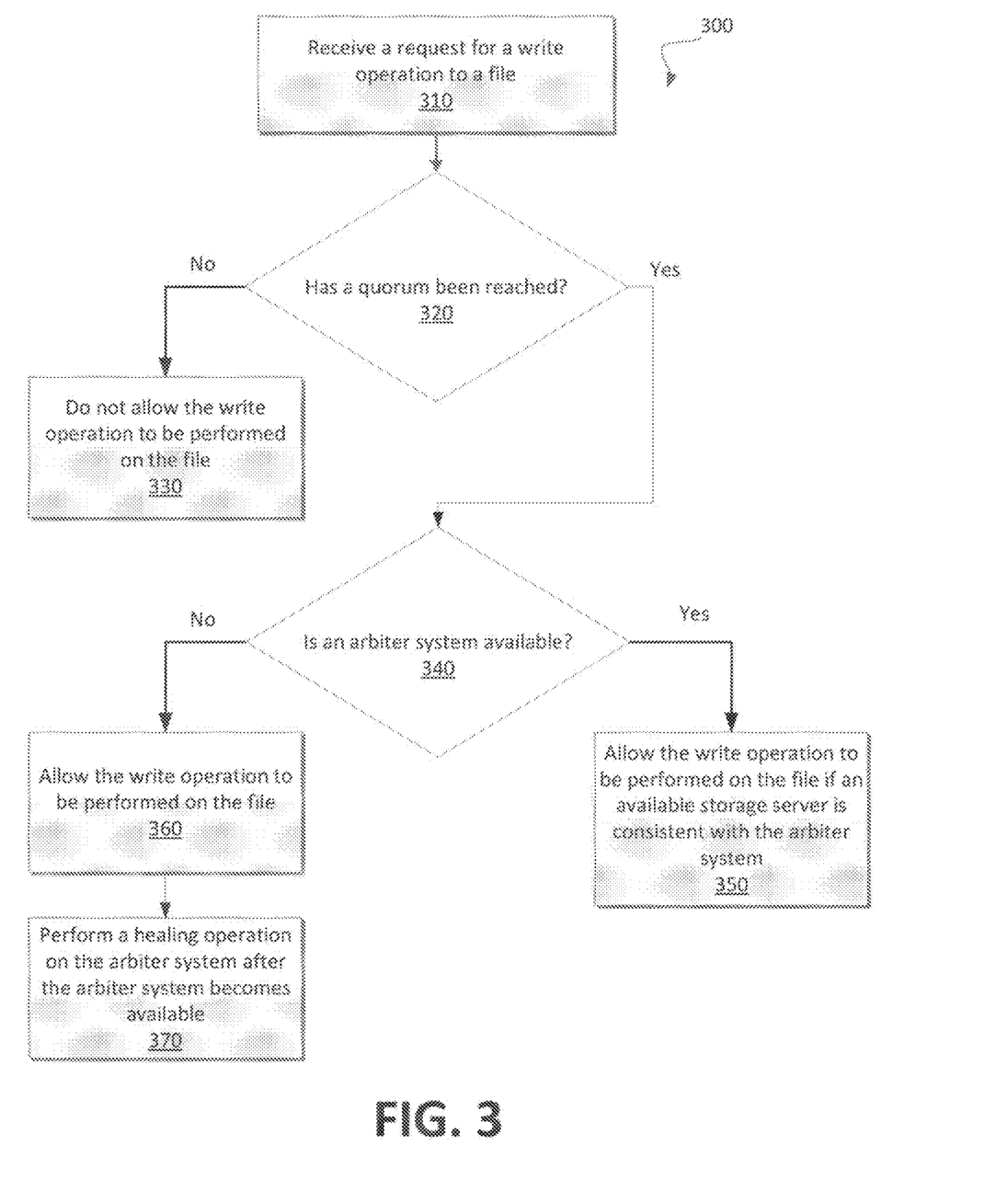
FIG. 3 is a flow diagram of an example method to determine whether to perform a write operation on a file based on the use of an arbiter system in accordance with some embodiments.

FIG. 3 is a flow diagram of an example method 300 to determine whether to perform a write operation on a file based on the use of an arbiter system. The method 300 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 300 may be performed by a write operation controller 190 or 200 of FIG. 1 or 2 of a management server associated with a distributed file system.

As shown, the method 300 may begin by the processing logic receiving a request for a write operation to a file (block 310). The file may be stored in a volume of a distributed file system where the files in the volume are subjected to a triple replication using a first storage server to store a first copy of the file, a second storage server to store a second copy of the file, and an arbiter system to store metadata associated with write operations to the file. The processing logic may further determine whether a quorum associated with the file has been reached based on two from the first storage server, second storage server, and the arbiter system being available (block 320). In some embodiments, the quorum may be reached when at least two of the first storage server, the second storage server, and the arbiter system are available to perform the write operation on a copy of the file and/or to record the receiving of the write operation to the file. If the quorum has not been reached, then the processing logic may not allow the write operation to be performed on the file (block 330). For example, if one of the first storage server, second storage server, and arbiter system is available (e.g., two are unavailable), then the quorum may not be reached and the write operation may not be performed on the file stored at the first or second storage server and the write operation may not be recorded by the arbiter system.

If the quorum has been reached, then the processing logic may determine whether the arbiter system is available (block 340). For example, a determination may be made as to whether the quorum has been reached based on the arbiter system being online and available to record data associated with write operations to the file. If the arbiter system is available and the quorum has been reached with one of the other storage servers being available, then the processing logic may allow the write operation to be performed based on write operation data of the arbiter system identifying that the available storage server is consistent with the arbiter system (block 350). Further details with regard to the using of write operation data to identify whether an available storage system is consistent with the arbiter system when the quorum is satisfied based on the arbiter system being available and one of the storage servers being available are described in conjunction with FIG. 5. If the arbiter system is not available and the quorum was reached with two of the first storage server, second storage server, and the arbiter system (e.g., the quorum was reached based on the first storage server and the second storage server being available), then the write operation may be performed on the file (block 360). For example, a first copy of the file stored at the first storage server and a second copy of the same file stored at the second storage server may each be changed based on the write operation. Furthermore, the processing logic may perform a healing operation on the arbiter system after the arbiter system returns to be available (block 370). For example, the data associated with the write operations that are stored at the arbiter system may be updated to reflect the write operation, or write operations, that were made to the file while the arbiter system was unavailable and the first and second storage resources were available. Thus, the changes to the copies of the file may be recorded at the arbiter system after the arbiter system becomes available.

Figure 4A:
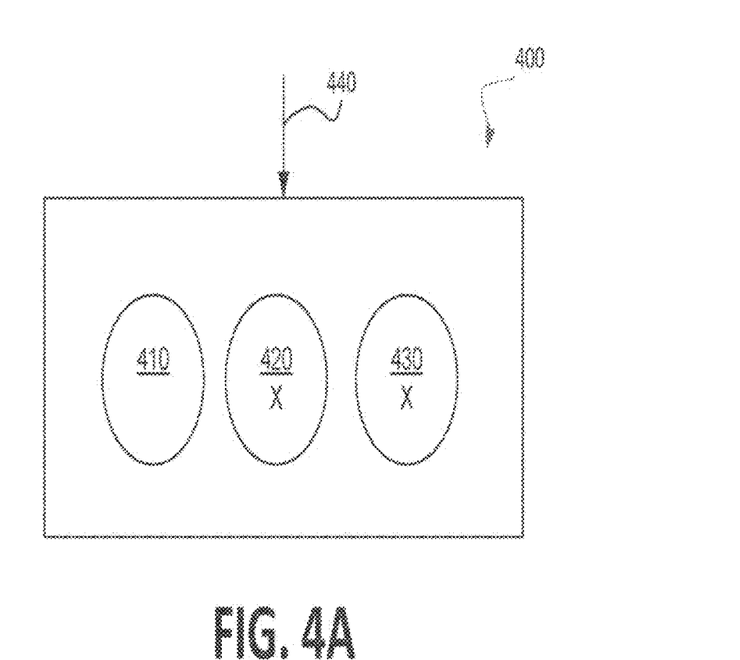
FIG. 4A is an illustrated example of a quorum associated with a file in a distributed file system not being satisfied in accordance with some embodiments of the disclosure.

FIG. 4A is an illustrated example 400 of a quorum associated with a file in a distributed file system not being satisfied. In general, the example 400 may represent a volume of a distributed file system that stores a file. Each of the files of the volume may be stored at a first storage server 410 and a second storage server 420 so that each storage system stores separate copies of the same files. Furthermore, the volume may include an arbiter system 430 that stores data associated with write operations to the file in the volume.

As shown, a write operation 440 may be received to modify a file in the volume. The first storage server 410 may be available and the second storage server 420 and the arbiter system 430 may be unavailable. As such, a quorum associated with the volume may not be satisfied and the write operation 440 may not be performed to change the file within the volume.

Figure 4B:
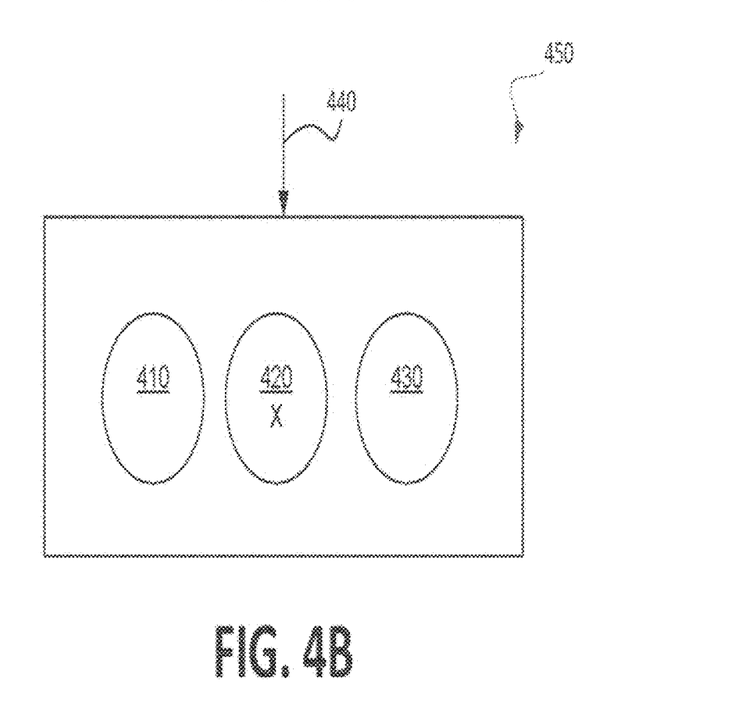
FIG. 4B is an illustrated example of a quorum associated with a file in a distributed file system being satisfied with an arbiter system being available in accordance with some embodiments of the disclosure.

FIG. 4B is an illustrated example 450 of a quorum associated with the file in the distributed file system being satisfied with the arbiter system 430 being available. As shown, the arbiter system 430 and the first storage server 410 may be available and the second storage server 420 may be unavailable. As such, the write operation 440 may be performed to change the file within the volume when the write operation data of the arbiter system 430 indicates that the first storage server 420 is consistent with the arbiter system. Further details with regard to the use of the write operation data to determine whether a storage server is consistent with an arbiter system are described on conjunction with FIG. 5.

Figure 4C:
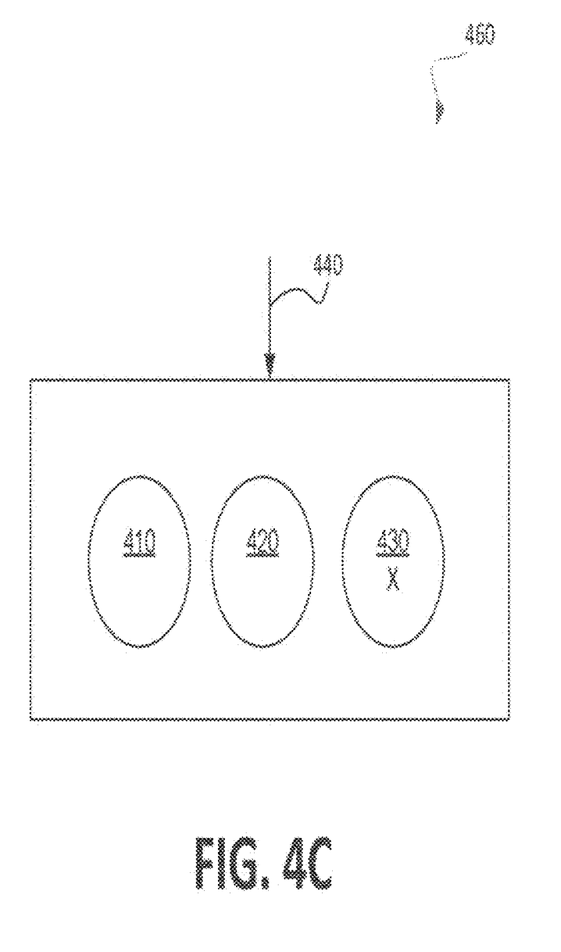
FIG. 4C is an illustrated example of a quorum associated with a file in a distributed file system being satisfied with an arbiter system being unavailable in accordance with some embodiments of the disclosure.

FIG. 4C is an illustrated example 460 of a quorum associated with the file in the distributed file system being satisfied with the arbiter system being unavailable. As shown, the arbiter system 430 may be unavailable and the first storage server 410 and the second storage server 420 may be available. As such, the write operation 440 may be performed to change the file within the volume by changing the copies of the file stored at the first and second storage servers 410 and 420.

Figure 5:
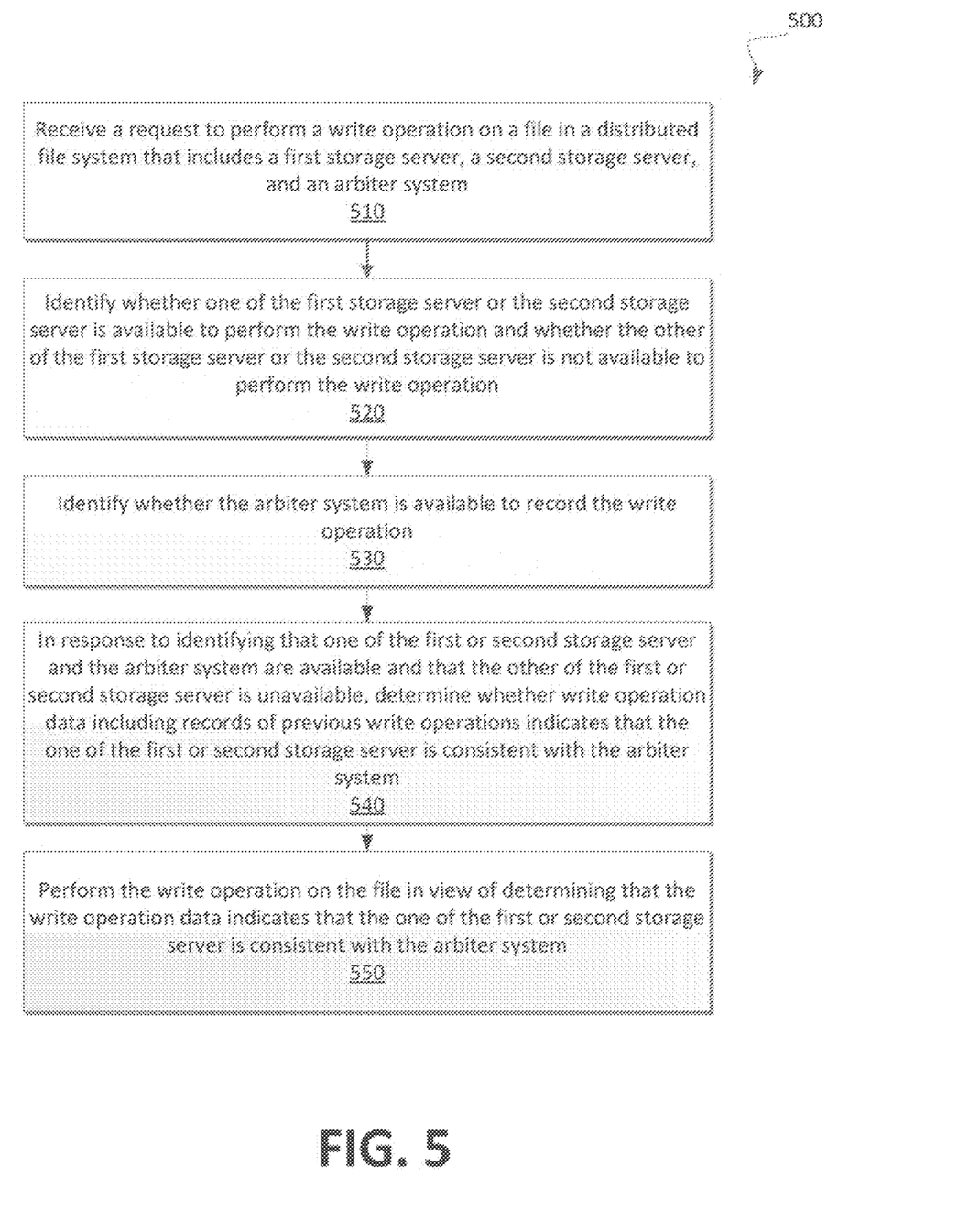
FIG. 5 is a flow diagram of an example method to perform a write operation to a file in a distributed file system based on write operation data in accordance with some embodiments.

FIG. 5 is a flow diagram of an example method 500 to perform a write operation to a file in a distributed file system based on matching write operation data. The method 500 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 500 may be performed by a write operation controller 190 or 200 of FIG. 1 or 2 of a management server associated with a distributed file system.

The method 500 may begin with the processing logic receiving a request to perform a write operation on a file stored in a distributed file system that includes a first storage server, a second storage server, and an arbiter system (block 510). The processing logic may further identify whether one of the first storage server or the second storage server is available (e.g., online) to perform the write operation and whether the other of the first storage server or the second storage server is not available to perform the write operation (block 520). The processing logic may further identify whether the arbiter system is available to record the write operation (block 530). In some embodiments, the identification of whether the first storage server, second storage server, or the arbiter system are available may be in response to determining that a quorum associated with the volume or distributed file system has been reached or satisfied. For example, the quorum may be reached with one out of the first storage server and the second storage server being available (and the other being unavailable) as well as the arbiter system being available. In response to identifying that one of the first or second storage server and the arbiter system are available and that the other of the first or second storage server is unavailable, the processing logic may determine whether write operation data that includes records of previous write operations indicates that the one of the first or second storage server is consistent with the arbiter system (block 540). In some embodiments, the write operation data may correspond to bits associated with the file. For example, the records of write operations included in the write operation data may identify whether a storage server has modified a file based on a particular write operation. In some embodiments, the write operation data at the arbiter system may identify whether a particular storage system has not yet changed a copy of the file based on a received write operation. In some embodiments, the write operation may indicate or identify whether the particular storage system has changed a copy of the file based on all preceding write operations that have been recorded by the arbiter system. As an example, a write operation may be received by the distributed file system. The first storage server and the arbiter system may be available and the second storage server may not be available when the write operation is received. As such, the arbiter system may record that the write operation has been received and the first storage server may modify a copy of the file stored at the first storage server. Furthermore, since the second storage server is unavailable and has not yet modified its corresponding copy of the file, the write operation data of the arbiter system may indicate that the second storage server is not currently consistent with the arbiter system (e.g., the second storage server has not yet performed the modification to its corresponding copy of the file). After the second storage server returns to be available and undergoes a healing operation so that the copy of the file at the second server system reflects the write operation, then the write operation data of the arbiter system may change the indication so that the write operation data of the arbiter system indicates that the second server system is now consistent with the arbiter system.

Referring to FIG. 5, the processing logic may perform the write operation on the file in view of determining that the write operation data indicates that the one of the first or second storage server is consistent with the arbiter system (block 540). The write operation may be performed when the write operation data from the arbiter system indicates that the available storage server is consistent with the arbiter system. For example, the copy of the file stored at the available storage server may be modified based on the write operation and the arbiter system may record the receiving of the write operation. Furthermore, after the second storage server returns to be available, a healing operation may be performed on the second storage server so that the copy of the file stored at the second storage server may reflect the write operation. Furthermore, the write operation data of the arbiter system may have identified that the second storage server was not consistent with the arbiter system (e.g., when the second storage server was unavailable when the write operation is allowed), and the write operation data may be changed to reflect that the second storage server is consistent with the arbiter system after the healing operation has completed. However, if the write operation data from the arbiter system indicates that the available storage server is not consistent with the arbiter system, then the write operation may not be performed or a determination may be made to not perform the write operation.

Figure 6:
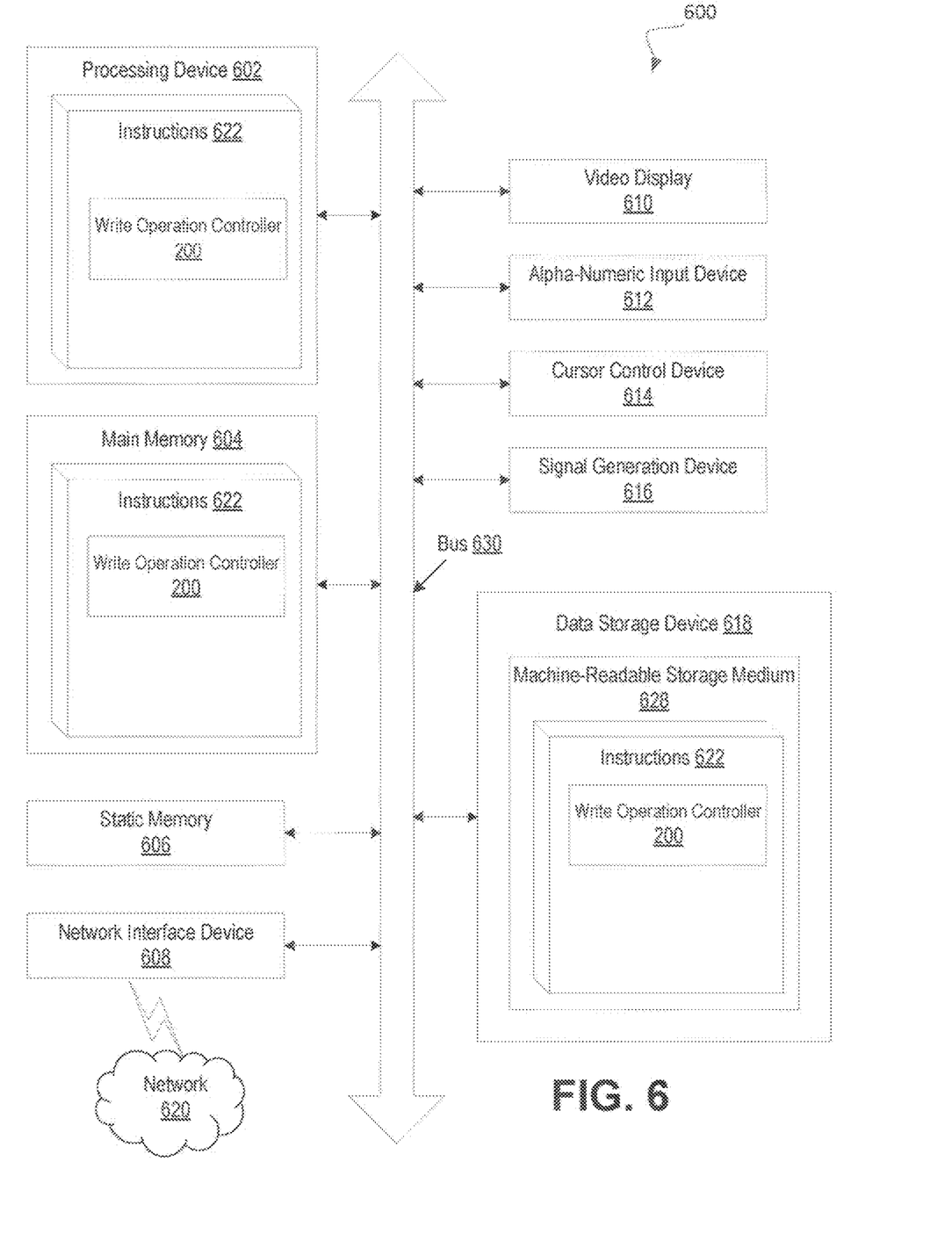
FIG. 6 illustrates a block diagram of an embodiment of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data storage device 618, which communicate with each other via a bus 630. The processing device 602 may be operatively coupled with the main memory 604, static memory 606, and/or the data storage device 618.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 may execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a write operation controller (e.g., write operation controller 190 of FIG. 1 and/or write operation controller 200 of FIG. 2) and/or a software library containing methods that call a write operation controller. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving a request to perform a write operation on a file stored in a distributed file system comprising a first storage server, a second storage server, and an arbiter system;
   determining whether a quorum of servers of the distributed file system is satisfied, by ascertaining that both the first storage server and the second storage server are available to store respective copies of the file and that the arbiter system is not available to store information of the write operation;
   performing, by a processing device, a write operation on the file in view of determining that the quorum has been satisfied; and
   in response to performing the write operation, performing a healing operation for the arbiter system, wherein the healing operation corresponds to recording the write operation being performed on the file.

2. The method of claim 1, wherein the servers of the distributed file system comprise a first storage server stores a first copy of the file, the second storage server stores a second copy of the file, and the arbiter system stores the information of the write operation and does not store a copy of the file.

3. The method of claim 1, further comprising:
   determining whether a storage server of the servers is consistent with an arbiter system of the servers, wherein the performing of the write operation on the file is further in view of determining that the storage server is consistent with the arbiter system.

4. The method of claim 1, wherein determining whether the quorum of the servers is satisfied comprises:
   determining that the arbiter system is available to store information of the write operation and one of the first storage server or the second storage server are available to store a copy of the file.

5. The method of claim 1, further comprising:
   in response to determining that the quorum has not been satisfied, determining to not perform the write operation on the file.

6. A system comprising:
   a memory; and
   a processing device, operatively coupled with the memory, to:
   receive a request to perform a write operation on a file stored in a distributed file system comprising a first storage server, a second storage server, and an arbiter system;

determine whether a quorum of servers of the distributed file system is satisfied, by ascertaining that both the first storage server and the second storage server are available to store respective copies of the file and that the arbiter system is not available to store information of the write operation;

perform a write operation on the file in view of determining that the quorum has been satisfied; and in response to performing the write operation, perform a healing operation for the arbiter system, wherein the healing operation corresponds to recording the write operation being performed on the file.

7. The system of claim 6, wherein the servers of the distributed file system comprise a first storage server stores a first copy of the file, the second storage server stores a second copy of the file, and the arbiter system stores the information of the write operation and does not store a copy of the file.

8. The system of claim 6, wherein the processing device is further to:

determine whether a storage server of the servers is consistent with an arbiter system of the servers, wherein the performing of the write operation on the file is further in view of determining that the storage server is consistent with the arbiter system.

9. The system of claim 6, wherein to determine whether the quorum of the servers is satisfied, the processing device is further to:

determine that the arbiter system is available to store information of the write operation and one of the first storage server or the second storage server are available to store a copy of the file.

10. The system of claim 6, wherein the processing device is further to:

in response to determining that the quorum has not been satisfied, determine to not perform the write operation on the file.

11. A non-transitory computer-readable medium comprising instructions that, when executed by a processing device, cause the processing device to:

receive a request to perform a write operation on a file stored in a distributed file system comprising a first storage server, a second storage server, and an arbiter system;

determine, by the processing device, whether a quorum of servers of the distributed file system is satisfied, by ascertaining that both the first storage server and the second storage server are available to store respective copies of the file and that the arbiter system is not available to store information of the write operation;

perform a write operation on the file in view of determining that the quorum has been satisfied; and in response to performing the write operation, perform a healing operation for the arbiter system, wherein the healing operation corresponds to recording the write operation being performed on the file.

12. The non-transitory computer-readable medium of claim 11, wherein the servers of the distributed file system comprise a first storage server stores a first copy of the file, the second storage server stores a second copy of the file, and the arbiter system stores the information of the write operation and does not store a copy of the file.

13. The non-transitory computer-readable medium of claim 11, wherein the processing device is further to:

in response to determining that the quorum has not been satisfied, determine to not perform the write operation on the file.

14. The non-transitory computer-readable medium of claim 11, wherein the processing device is further to:

determine whether a storage server of the servers is consistent with an arbiter system of the servers, wherein the performing of the write operation on the file is further in view of determining that the storage server is consistent with the arbiter system.

* * * * *